(12) United States Patent
Williams

(10) Patent No.: US 7,118,727 B2
(45) Date of Patent: Oct. 10, 2006

(54) METHOD OF MAKING OXIDE PARTICLES

(75) Inventor: Darryl Stephen Williams, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 474 days.

(21) Appl. No.: 10/462,053

(22) Filed: Jun. 16, 2003

(65) Prior Publication Data

US 2004/0253174 A1    Dec. 16, 2004

(51) Int. Cl.
*C01G 1/00*    (2006.01)
*C01G 57/00*    (2006.01)

(52) U.S. Cl. .................. 423/592.1; 423/179; 423/155; 423/69; 423/62; 423/53; 423/99; 423/21.1; 423/111; 423/89; 423/641; 423/635; 423/608; 423/606; 423/594.17; 423/622; 423/624; 423/619; 423/618; 423/22; 423/23; 423/49; 423/87; 423/138; 423/604; 423/605; 423/617; 423/632; 423/594.18; 423/594.19; 423/263; 423/335; 423/277; 977/773; 977/775; 977/777; 977/811

(58) Field of Classification Search ................ 423/179, 423/155, 184, 158, 69, 85, 62, 64, 65, 53, 423/55, 99, 101, 21.1, 111, 122, 89, 92, 641, 423/635, 608, 606, 594.17, 622, 624, 592.1, 423/619, 618, 22, 23, 49, 87, 138, 617, 632, 423/594.18, 594.19, 263, 335, 277, 604, 423/605; 977/773, 775, 777, 811
See application file for complete search history.

(56) References Cited

U.S. PATENT DOCUMENTS

| | | | |
|---|---|---|---|
| 4,798,710 A * | 1/1989 | Legrand et al. ............... 423/69 |
| 5,277,888 A * | 1/1994 | Baron et al. ................ 423/335 |
| 5,427,767 A | 6/1995 | Kresse et al. |
| 5,637,258 A | 6/1997 | Goldburt et al. |
| 5,656,329 A | 8/1997 | Hampden-Smith et al. |
| 5,698,483 A * | 12/1997 | Ong et al. .................... 501/12 |
| 5,894,064 A | 4/1999 | Hampden-Smith et al. |
| 5,985,173 A | 11/1999 | Gray et al. |
| 6,017,390 A | 1/2000 | Charych et al. |
| 6,030,599 A | 2/2000 | Noweck et al. |
| 6,180,029 B1 | 1/2001 | Hampden-Smith et al. |
| 6,329,058 B1 | 12/2001 | Arney et al. |
| 6,360,562 B1 | 3/2002 | Kodas et al. |
| 6,432,526 B1 | 8/2002 | Arney et al. |
| 6,610,135 B1 * | 8/2003 | Ohmori et al. ............. 106/436 |
| 6,984,369 B1 * | 1/2006 | Alivisatos et al. ....... 423/592.1 |
| 2005/0031534 A1 * | 2/2005 | Asai ........................... 423/608 |

\* cited by examiner

*Primary Examiner*—Timothy C. Vanoy
(74) *Attorney, Agent, or Firm*—Francis T. Coppa; Patrick K. Patnode

(57) ABSTRACT

The present invention provides a process for producing particles, such as oxide nanoparticles, in a substantially water-free environment. The process involves mixing at least one metal compound of the formula $MX_{(m-n)}$ with at least one surfactant and at least one solvent, wherein M is an electropositive element of Groups 1–15; each X is independently selected from the group consisting of $O_{1/2}$, F, Cl, Br, I, OR, $O_2CR$, $NR_2$, and R; each R is independently a hydrocarbyl group; n is equal to ½ the oxidation state of the metal M in the product particle; and m is equal to the oxidation state of the element M. The components are typically combined to form a mixture which is thermally treated for a time period sufficient to convert the metal compound into particles of the corresponding oxide, having sizes in a range between about 0.5 nanometer and about 1000 nanometers. Examples of metal compounds employed in this process include materials such as $Si(OR)_4$, $Ti(OR)_4$ (where R is as described above), $(Zr(OiPr)_2)(OAc)_2$, and the like. Illustrative oxide materials which can be prepared by this process include $TiO_2$, $ZrO_2$, $SiO_2$, and $B_2O_3$.

19 Claims, No Drawings

METHOD OF MAKING OXIDE PARTICLES

BACKGROUND OF THE INVENTION

This invention generally relates to a method for the synthesis of oxide nanoparticles. More specifically, it relates to oxide nanoparticles synthesized in an essentially water free environment.

There is a great deal of interest in particulate materials in a controlled fashion with particle sizes less than about 1000 nm, commonly referred to as nanoparticles. Nanoparticles exhibit a unique size dependence on their physical properties, such as bandgap, superparamagnetism, and optical properties. Nanoparticles are also interesting as fillers due to their extremely high surface/volume ratios and the fact that, due to their size, they scatter visible light poorly.

Conventionally, metal oxide particles may be prepared by precipitation from aqueous solutions, for example, when a soluble metal salt solution undergoes a pH change. Nitrate, carbonate, oxalate, and similar metal salts may be thermally decomposed to yield oxides from aqueous solutions as well. The book entitled "Treatise in Inorganic Chemistry", by H. Remy, translated by J. S. Anderson and edited by J. Kleinberg, Elsevier, 1956 discusses such methods. In these processes, water is unavoidably retained in the particulate oxide particle. Residual proton content is very difficult to eliminate.

The sol gel process is well known for producing hydrous metal oxides, which can then be calcined, but also invariably contain excess hydrogen in the product. This method has also been used to produce various metal oxide nanoparticles, and even metal oxide coatings of nanoparticles, with mixed results. In one case, a substoichiometric amount of water is used in the hydrolysis of alkoxide precursors to form titania nanoparticles.

Previous methods for producing hydrous metal oxides can cause difficulty in forming oxide nanoparticles due to the continuing presence of water. Thus, there remains a need to produce oxide nanoparticles using precursors similar to those used in a sol-gel process without addition of water for hydrolysis of the precursor.

SUMMARY OF THE INVENTION

A process for producing particles is provided which comprises mixing, in a substantially water-free environment,
  a) at least one metal compound of the formula $MX_{(m-n)}$, or mixtures thereof, wherein M is an electropositive element of Groups 1–15, each X is independently selected from the group consisting of $O_{1/2}$, F, Cl, Br, I, OR, $O_2CR$, $NR_2$, and R, each R is independently a hydrocarbyl group, n is equal to ½ the oxidation state of the metal M in the product particle, and m is equal to the oxidation state of M in the compound $MX_{(m-n)}$;
  b) at least one surfactant, and
  c) at least one solvent,
  wherein the mixture is thermally treated for a time sufficient to convert the at least one metal compound into particles of the corresponding oxide having sizes in a range between about 0.5 nanometers and about 1000 nanometers.

DETAILED DESCRIPTION OF THE INVENTION

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

Any reference to elements of Groups of the Periodic Table are made in reference to the Periodic Table of the Elements, as published in "Chemical and Engineering News", 63(5), 27, 1985. In this format, the Groups are numbered from 1 to 18.

The present invention comprises a process for producing particles, comprising mixing, in a substantially water-free environment, at least one metal compound of the formula $MX_{(m-n)}$, or mixtures thereof, wherein M is an electropositive element of Groups 1–15, each X is independently selected from the group consisting of $O_{1/2}$, F, Cl, Br, I, OR, $O_2CR$, $NR_2$, and R, each R is independently a hydrocarbyl group, n is equal to ½ the oxidation state of the metal M in the product particle, and m is equal to the oxidation state of M in the compound $MX_{(m-n)}$, with at least one surfactant, in at least one solvent, and thermally treating the mixture for a time sufficient to convert the at least one metal compound into particles of the corresponding oxide(s) having a size in a range between about 0.5 nanometer (nm) and about 1000 nm. Optionally, the surfactant may be the solvent, Lewis base, or part of the metal compound. In some embodiments, the metal compound has the formula $M(O_2CR)_nX_{(m-n)}L_p$, (or mixtures thereof), wherein M, X, R, m, and n are as described above; each L is independently a Lewis base ligand, and p>0. In this instance, X and/or L can be surfactants. e.g., pre-mixed with a compound of the formula $M(O_2CR)_n$. If desired additional surfactants can be used in the process.

This process for producing metal oxide nanoparticles specifically avoids water so that the formation of the oxide particles will not be inhibited by the presence of unreacted hydroxyls, which limits the density and crystallinity of the resulting oxide particles. "Substantially water-free environment" as used herein refers to a mixture that typically has less than about 100 parts per million (ppm) water, and more typically, less than about 10 ppm water.

The term "hydrocarbyl group", as used herein, denotes a monovalent, linear, branched, cyclic, or polycyclic group containing carbon and hydrogen atoms, the hydrocarbyl group optionally containing atoms in addition to carbon and hydrogen, atoms selected from Groups 15, and 16 of the Periodic Table and further containing C1–C30 alkyl; C1–C30 alkyl substituted with one or more groups selected from C1–C30 alkyl, C3–C15 cycloalkyl or aryl; C3–C15 cycloalkyl; C3–C15 cycloalkyl substituted with one or more groups selected from C1–C20 alkyl, C3–C15 cycloalkyl or aryl; C6–C15 aryl; and C6–C15 aryl substituted with one or more groups selected from C1–C30 alkyl, C3–C15 cycloalkyl or aryl; wherein aryl denotes a substituted or unsubstituted phenyl, naphthyl, or anthracenyl group.

Preferably the molar ratio of the surfactant to the metal compound is from about 0.01 to about 100. More preferably, the molar ratio of the surfactant to the metal compound is from about 0.25 to about 30. Most preferably, the molar ratio of the surfactant to the metal compound is from about 1 to about 10.

The generation and introduction into the solvent of the metal compound, $MX_{(m-n)}$, of the present invention is not limited in any way. This includes, for example, dissolution of a pure species of the metal compound, as well as by mixing multiple precursors. For example, mixing in situ $MX_m$ with a carboxylic acid anhydride $(RCO)_2O$, the conjugate acid of another X or the carboxylate $O_2CR$, a complex of X or the carboxylate $O_2CR$, or a salt of X or the carboxylate $O_2CR$, may be undertaken. When appropriate, the ligand L may also be incorporated into the mixture. Said group L, X, the solvent, or the carboxylate $O_2CR$ may each optionally be a surfactant for the purposes of this invention.

Non-limiting examples of the metal M in the compound are alkali metals such as Li, Na, K, Rb, or Cs; alkaline earths such as Mg, Ca, Sr, or Ba; transition metals of groups 3 through 12 such as Y, Ti, Zr, Nb, Ta, W, or Zn; rare earths such as Ce, Pr, Nd, Dy, Th, Eu, Gd, Er, or La; metalloids such as B, Al, Ga, In, Sn, or Pb; and the like.

The anionic group X is, in general, independently selected from the group consisting of $O_{1/2}$, F, Cl, Br, I, OR, $O_2CR$, $NR_2$, and R, each R is independently a hydrocarbyl group. The group X may optionally be a surfactant.

Examples of alkoxides, OR, useful herein as the anionic group X are methoxide, ethoxide, i-propoxide, n-butoxide, t-butoxide, nonylphenoxide, dodecoxide, tetradecoxide, hexadecoxide, phenoxide, 2,6-dimethylphenoxide, halogenated alkoxides such as trifluoromethoxide, trifluoroethoxide, hexafluoro-i-propoxide, and the like.

Examples of carboxylates, $O_2CR$, useful herein as the anionic group X or as the carboxylate $O_2CR$ are formate, acetate, propionate, laurate, acetate, stearate, neodecanoate, 2-ethylhexanoate, benzoate, p-aminobenzoate, p-nitrobenzoate, pivalate, and the like.

Examples of amides, $NR_2$, useful herein as the anionic group X are dimethylamide, diethylamide, di-n-propylamide, di-i-propylamide, diphenylamide, bis-2,6-dimethylphenylamide, bis-2,6-di-i-propylphenylamide, N-methylanilide, and the like, heterocyclic amides such as the conjugate bases of pyrrole, pyrrolidine, piperidine, piperazine, indole, imidazole, azole, thiazole, purine, phthalimide, azacycloheptane, azacyclooctane, azacyclononane, azacyclodecane, their substituted derivatives, and the like.

Examples of alkyls, R, useful herein as the anionic group X are methyl, ethyl, propyl, butyl, dodecyl, tetradecyl, hexadecyl, phenyl, 2,6-dimethylphenyl, benzyl, neopentyl, any hydrocarbyl group as defined above, and the like.

The Lewis base may be any neutral (i.e. non-ionic) compound containing at least one electronegative atom from groups 15 and 16, said atom binding to M via this atom in a dative interaction. Said Lewis base may additionally be a surfactant, for the purposes of this invention.

Examples of the Lewis base L are mono- or multidentate alcohols, ethers, esters, ketones, carboxylic acid amides, amines, phosphines, phosphine oxides, phosphites, phosphates, thiols, thioethers, sulfones, sulfoxides, and the like.

Examples of alcohols useful herein as the Lewis base L are methanol, ethanol, isopropanol, octanol, decanol, dodecanol, tetradecanol, octadecanol, phenol, t-butylphenol, nonylphenol, benzyl alcohol, and the like.

Examples of ethers useful herein as the Lewis base L are tetrahydrofuran, diethyl ether, dipropyl ether, diisopropyl ether, dibutyl ether, dioctyl ether, tert-butyl methyl ether, trimethylene oxide, 1,2-dimethoxyethane, 1,2-dimethoxypropane, 1,3-dimethoxypropane, 1,2-dimethoxybutane, 1,3-dimethoxybutane, 1,4-dimethoxybutane, tetrahydropyran, and the like.

Examples of carboxylic acid esters useful herein as the Lewis base L are methyl formate; methyl acetate; ethyl acetate; vinyl acetate; propyl acetate; butyl acetate; isopropyl acetate; isobutyl acetate; octyl acetate; methyl benzoate; ethyl benzoate; dimethyl maleate; dimethyl phthalate; diethyl phthalate; and the like.

Examples of ketones useful herein as the Lewis base L are acetone; 2-butanone; pinacolone; acetophenone; benzophenone; mesityl oxide; hexafluoroacetone; perfluoro-2-butanone; 1,1,1,3,3,3-hexafloroacetone and the like.

Examples of carboxylic acid amides useful herein as the Lewis base L are formamide; acetamide; propionamide; isobutyramide; trimethylacetamide; cyclohexanecarboxamide; acrylamide; methacrylamide; 2,2,2-trifluoroacetamide; benzamide; N-methylformamide; N,N-dimethylformamide; 1-acetylpyrrolidine; 1-acetylpiperidine; 1-acetylpiperazine; and the like.

Examples of amines useful herein as the Lewis base L are ammonia; methylamine; ethylamine; propylamine; octylamnine; cyclohexylamine; aniline; dimethylamine; diethylamine; dioctylamine; dicyclohexylamine; trimethylamine; triethylamine; N-methylaniline; dimethylaniline; N,N-diethylaniline; piperidine; piperazine; pyridine; morpholine; N-methylmorpholine and the like.

Phosphorus compounds useful herein as the Lewis base L are saturated or unsaturated aliphatic, alicyclic, or aromatic phosphorus compounds having 2 to 50 carbon atoms containing at least one phosphorus atom. Included within the phosphorus compounds are compounds containing heteroatoms, which are atoms other than carbon, selected from Groups 13, 14, 15, 16 and 17 of the Periodic Table of Elements.

Examples of phosphines useful herein as the Lewis base L are trimethylphosphine; triethylphosphine; trioctyl phosphine, tris(2-ethylhexylphosphine), triphenylphosphine; tri-p-tolylphosphine; tri-m-tolylphosphine; tri-o-tolylphosphine; methyldiphenylphosphine; ethyldiphenylphosphine; isopropyldiphenylphosphine; allyldiphenylphosphine; cyclohexyldiphenylphosphine; benzyldiphenylphosphine; and the like.

Examples of phosphine oxides useful herein as the Lewis base L are trimethylphosphine oxide; triethylphosphine oxide; trioctyl phosphine, tris(2-ethylhexylphosphine), triphenylphosphine oxide; tri-p-tolylphosphine oxide; tri-m-tolylphosphine oxide; tri-o-tolylphosphine oxide; methyldiphenylphosphine oxide; ethyldiphenylphosphine oxide; isopropyldiphenylphosphine oxide; allyldiphenylphosphine oxide; cyclohexyldiphenylphosphine oxide; benzyldiphenylphosphine oxide; and the like.

Examples of phosphites useful herein as the Lewis base L are trimethylphosphite; triethylphosphite; trioctyl phosphine, tris(2-ethylhexylphosphine), triphenylphosphite; tri-p-tolylphosphite; tri-m-tolylphosphite; tri-o-tolylphosphite; methyldiphenylphosphite; ethyldiphenylphosphite; isopropyldiphenylphosphite; allyldiphenylphosphite; cyclohexyldiphenylphosphite; benzyldiphenylphosphite; and the like.

Examples of phosphates useful herein as the Lewis base L are trimethylphosphate; triethylphosphate; trioctyl phosphine, tris(2-ethylhexylphosphine), triphenylphosphate; tri-p-tolylphosphate; tri-m-tolylphosphate; tri-o-tolylphosphate; methyldiphenylphosphate; ethyldiphenylphosphate; isopropyldiphenylphosphate; allyldiphenylphosphate; cyclohexyldiphenylphosphate; benzyldiphenylphosphate; and the like.

Examples of thiols useful herein as the Lewis base L are methanane thiol; ethanane thiol; isopropanane thiol; octanane thiol; decanane thiol; dodecanane thiol; tetradecanane thiol; octadecanane thiol; thiophenol; t-butylthiophenol; nonylthiophenol; benzyl thiol; and the like.

Examples of thiosulfides useful herein as the Lewis base L are tetrahydrothiophene, diethyl sulfide, dibutyl sulfide, dioctyl sulfide, tert-butyl methyl sulfide, and the like.

Examples of sulfones useful herein as the Lewis base ligand L are methyl sulfone; ethyl sulfone; phenyl sulfone; 2-(phenylsulfonyl)tetrahydropyran; and the like.

Examples of sulfoxides useful herein as the Lewis base L are methyl sulfoxide; ethyl sulfoxide; methyl phenyl sulfoxide; benzyl sulfoxide; tetramethylene sulfoxide; and the like.

The metal compound $MX_{(m-n)}$ or $M(O_2CR)_n X_n L_m$ may be generated in the solvent, introduced in the solvent, or both generated and introduced in any way to the solvent prior to contact with the surfactant and optionally, the dehydrating agent, including dissolution of a pure species or by mixing, e.g., a metal alkoxide with the optional Lewis base (L), in situ.

Preferred examples of the metal compound are the acetate, laurate, stearate, 2-ethylhexanoate, and neodecanoate salts of Na, Ca, Ba, Y, Ti, Zr, Nb, Zn, B, Al, Si, Ge, and Sn, $Ti(laurate)_2(OiPr)_2$, $Ti(laurate)_2(OMe)_2$, $Zr(laurate)_2(OiPr)_2$, $Hf(laurate)_2(OiPr)_2$, $B_3O_3(OAc)_3$, $Al(OAc)_3$, $Bu_2Sn(OAc)_2$ $Si(OR)_4$, $Ti(OR)_4$, $Zr(OR)_4$, NaOAc, $Ca(OAc)_2$, $Ba(OAc)_2$, $Y(OAc)_3$, $Ti(OMe)_2(OAc)_2$, $Ti(OiPr)_2(OAc)_2$, $Zr(OiPr)_2(OAc)_2$, $Nb(OAc)_{5/2}(OEt)_{5/2}$, $W(O)(OAc)_2(OEt)_2$, $Re(O)(OAc)_3py_2$, $Zn(OAc)_2$ and $B(OAc)_3$.

In the present invention, the surfactant is used to control the size of the particles. Typically, the particles have a variation in size distribution in a range between about −50% and about +50%.

The at least one surfactant useful herein can be any compound with a polar group on one end and a non-polar tail having at least six atoms. In general, surfactants may be either nonionic, ionic, or combinations thereof. The surfactant may or may not form an ionic, covalent, or dative bond with the metal compound. The surfactant may or may not form a micellar structure before, during, or after the reaction to form the oxide nanoparticles. Typically, the surfactant comprises a compound which may be expressed in the form T–H, where T is a tail group, typically a non-polar group containing 6–22 carbon atoms and optionally other atoms and H is a head group, typically a polar group which interacts with the precursor, the nanoparticle surface, or both. Examples of head groups are sulfate ($(-O)_2SO_2$), sulfonate ($-SO_2OH$), sulfinate ($-SOOH$), phosphate ($(-O)_3PO$), phosphite ($(-O)_3P$) phosphine ($-P$), phosphine oxide ($-PO$), phosphinate ($-POOH$), phosphonate $-OPO(OH)_2$, carboxylate ($-COOH$), hydroxy-terminated poly(ethylene glycol) ($-O(CH_2CH_2O)H$), alcohol ($-OH$) and thiol ($-SH$).

Exemplary non-ionic surfactants of the present invention include compounds of the formula $O_p EX^1_3$ wherein E is selected from the group consisting of N, P, and As, wherein each $X^1$ is independently $OR^1$ or $R^1$, and wherein each $R^1$ is independently hydrogen or a hydrocarbyl group, wherein p is between 0 and 1 and at least one R contains at least 6 carbon atoms.

Other non-ionic surfactants of the present invention include compounds of the formula $O_q SX^1_2$, wherein each $X^1$ is independently $OR^1$ or $R^1$, wherein each $R^1$ is independently hydrogen or a hydrocarbyl group wherein q is between 0 and 2, and wherein at least one $R^1$ contains at least 6 carbon atoms.

Exemplary non-ionic surfactants may also be compounds of the formula $HAR^2$, wherein A is selected from the group consisting of O and S, wherein each $R^2$ is independently a hydrocarbyl group, and wherein at least one $R^2$ contains at least 6 carbon atoms.

The non-ionic surfactant may also be compounds of the formula: $R^2C(O)X^2$ wherein $R^2$ is a hydrocarbyl group containing at least 6 carbon atoms, $X^2$ is selected from the group consisting of OH, $NH_2$, SH, and the like.

Typically, non-ionic surfactants useful herein are carboxylic acids of the formula RCOOH such as oleic acid, stearic acid, linoleic acid, lauric acid, 2-ethylhexanoic acid, azelaic acid, palmitic acid, linolenic acid, erucic acid and the like; amines such as stearyl amine, oleyl amine, erucic amine, lauryl amine and the like; alcohols such as decanol, cetyl alcohol, oleyl alcohol, stearyl alcohol, lauryl alcohol and the like; thiols such as decanethiol, dodecanethiol, tetradecanethiol, hexadecanethiol, and the like; phosphines such as trioctylphosphine, tris(2-ethylhexyl)phosphine, triphenylphosphine, tri-p-tolylphosphine, tri-m-tolylphosphine, tri-o-tolylphosphine, methyldiphenylphosphine, ethyldiphenylphosphine; cyclohexyldiphenylphosphine; benzyldiphenylphosphine, and the like; phosphine oxides such as trioctyl phosphine oxide, tris(2-ethylhexyl)phosphine oxide, triheptyl phosphine oxide, tripentyl phosphine oxide, tridecyl phosphine oxide and the like; phosphites such as tris(2-ethylhexyl)phosphite, trioleyl phosphite, trilauryl phosphite, tristeryl phosphite, di isodecyl pentaerythytol diphosphite, trioctyl phosphite, triphenyl phosphite, tricyclodecane dimethanol phosphite and the like; phosphates such as tris(2-ethylhexyl)phosphate, trioleyl phosphate, tristearyl phosphate, trilauryl phosphate, tributyl phosphate, trioctyl phosphate and the like; sulfoxides such as decyl methyl sulfoxide, dimethyl sulfoxide, dioleyl sulfoxide, dilauryl sulfoxide, distearyl sulfoxide and the like; sulfones such as tosyloxyphenyl sulfone, tosyloxyvinyl sulfone and the like.

The surfactant may be an ionic surfactant. For example, the surfactant may be a compound of the formula $[E^1R^2_4]^+ W^-$, wherein W is selected from the group consisting of F, Cl, Br, I, and OR, wherein $E^1$ is selected from the group consisting of N, P, and wherein each $R^2$ is independently a hydrocarbyl group, and wherein at least one $R^2$ contains at least 6 carbon atoms.

Another exemplary ionic surfactant is a compound of the formula $[J]^{x+}[O_r SX^1_s]^{y-}$ wherein J is selected from the group consisting of Li, Na, K, Rb, Cs, Be, Mg, Ca, Sr, Ba, $NR_4$, and $PR_4$, wherein each $X^1$ is independently $OR^1$ or $R^1$, wherein each $R^1$ is independently hydrogen or a hydrocarbyl group, wherein r is between 1 and 3, wherein s is between 1 and 2, wherein at least one R contains at least 6 carbon atoms, and wherein the sum of "x+" and "y−" is zero.

A further exemplary ionic surfactant is a compound of the formula $[J]^{x+}[O_t PX^1_u]^{y-}$ wherein J is selected from the group consisting of Li, Na, K, Rb, Cs, Be, Mg, Ca, Sr, Ba, $NR_4$, and $PR_4$, wherein each $X^1$ is independently $OR^1$ or $R^1$, wherein each $R^1$ is independently hydrogen or a hydrocarbyl group, wherein t is between 0 and 3, u is between 1 and 3, x is between 1 and 2, y is between 1 and 3 with the proviso that the sum of "x+" and "y−" is zero, and wherein at least one $R^1$ contains at least 6 carbon atoms.

Yet another exemplary ionic surfactant is of the formula: $J^1AR^2$, wherein $J^1$ is selected from the group consisting of Li, Na, K, Rb, Cs, Be, Mg, Ca, Sr and Ba, wherein A is selected from the group consisting of O and S, wherein $R^2$ is independently a hydrocarbyl group, and wherein at least one $R^2$ contains at least 6 carbon atoms.

Examples of ionic surfactants include compounds where the polar group is an ionic group or a salt, including sulfonates such as sodium dodecyl sulfate, sodium lauryl sulfate, sodium benzene sulfonate, sodium tolylsulfonate and the like; ammonium salts such as tetrabutyl ammonium hydroxide, tetraethyl ammonium hydroxide, cetyl trimethyl ammonium bromide, tetraphenyl ammonium hydroxide and the like; alkoxides and thiolates with counterions such as lithium, sodium, potassium, calcium, magnesium, and the like.

In some embodiments the surfactant may be a dehydrating agent. The dehydrating agents may comprise acid anhydrides, thionyl chloride, phosphorus oxides and combinations thereof.

The at least one solvent useful herein can be any liquid in which the metal compound(s) and the surfactants(s), either separately or together, are soluble at the heating temperature. Commonly used solvents for this purpose include hydrocarbon solvents. Exemplary solvents include hexadecane, dioctyl ether, and diphenyl ether. Other solvents useful for the present invention include aromatic and aliphatic solvents containing at least seven carbons such as dibutyl ether, didecyl ether, dodecane, tetradecane, decaline, toluene, xylenes, mesitylene, anisole, dichlorobenzenes, dimethylsulfoxide, sulfolane, and the like.

The order of adding the components of the solution is not limited. Typically, the alkoxide precursor and the surfactant may be dissolved in the solvent and refluxed for an appropriate time. The time of refluxing of the reactive mixture may vary between about 10 minutes and 100 hours in one embodiment of the present invention. In a preferred embodiment of the present invention, the time for refluxing varies between about 20 minutes and about 72 hours. Then, additional solvent, and/or other components may be added continuously or incrementally. In one embodiment of the present invention, the mixing may be conducted at a temperature between about 50° C. and about 350° C., while in a second embodiment the mixing may be conducted at a temperature between about 150° C. and about 250° C.

The amount of the various components in the solution is not particularly limited and can be determined on a case-by-case basis by one skilled in the art. Typically, the amounts of the metal compound and the surfactant are such that the molar ratio of the surfactant to the metal compound is from about 0.25:30 to about 1:10. The amount of solvent can range from about 0.1 L per mole to about 10000 L per mole of metal compound.

It should be noted that the mixing of the precursor(s), surfactant(s), and the solvent is preferably performed under conditions providing solutions which are substantially free of particulate matter prior to the treatment which affords the nanoparticle containing colloid.

The metal oxide nanoparticles of the present invention have utility in many areas, especially due to the absence of water. In particular, they can be used as fillers for modifying the following properties of the matrix to be filled: refractive index, coefficient of thermal expansion, viscosity, optical density, heat deflection temperature, fracture toughness, glass transition temperature, color, bulk density, flame retardancy, adhesion, electrical conductivity, thermal conductivity, crosslinking density, thermal stability, UV stability, and gas permeabilty.

In order that those skilled in the art will be better able to practice the invention, the following examples are given by way of illustration and not by way of limitation.

EXAMPLES

Preparation of oxide particles:

Example 1

$TiO_2$ 1397 milligrams (mg) of Lauric acid was weighed into a 100 milliliter (mL) Fisher-Porter tube with a stirbar, and to this was added 8 mL hexadecane. This mixture was stirred rapidly, and 519 μL Titanium tetraisopropoxide ($Ti(OiPr)_4$) was added. The tube was sealed with a pressure head having a thermocouple attached, and the reaction mixture was heated to 250° C. within 5 min. The temperature was held at 250° C. for 30 min, resulting in a slightly milky transparent solution. The colloidal solution was then cooled to room temperature and placed into a vial. The average particle size as determined by dynamic light scattering was 13 nanometers (nm).

Example 2

$TiO_2$ 3.495 grams (g) of Lauric acid was weighed into a 100 mL Fisher-Porter tube with a stirbar, and to this was added 8 mL hexadecane. This mixture was stirred rapidly, and 519 μL $Ti(OiPr)_4$ was added. The tube was sealed with a pressure head having a thermocouple attached, and the reaction mixture was heated to 250° C. within 5 min. The temperature was held at 250° C. for 30 min, resulting in a slightly milky transparent solution. The colloidal solution was then cooled to room temperature and placed into a vial. The average particle size as determined by dynamic light scattering was 8.5 nm.

Example 3

$TiO_2$ 853 mg of Stearic acid was weighed into a 100 mL Fisher-Porter tube with a stirbar, and to this was added 8 mL hexadecane. This mixture was stirred rapidly, and 446 μL $Ti(OiPr)_4$ was added. The tube was sealed with a pressure head having a thermocouple attached, and the reaction mixture was heated to 250° C. within 5 min. The temperature was held at 250° C. for 30 min, resulting in a transparent solution. The colloidal solution was then cooled to room temperature and placed into a vial. The average particle size as determined by dynamic light scattering was 24 nm.

Example 4

$ZrO_2$ 601 mg of Lauric acid was weighed into a 100 mL Fisher-Porter tube with a stirbar, and to this was added 8 mL hexadecane. This mixture was stirred rapidly, and 672 μL 70 wt % Zirconium tetra-n-propoxide ($Zr(OnPr)_4$) in n-propanol (nPrOH) was added. The tube was sealed with a pressure head having a thermocouple attached, and the reaction mixture was heated to 250° C. within 5 min. The temperature was held at 250° C. for 30 min, resulting in a colorless transparent solution. The colloidal solution was then cooled to room temperature and placed into a vial. The average particle size as determined by dynamic light scattering was 6 nm.

Example 5

SiO$_2$ 601 mg of Lauric acid was weighed into a 100 mL Fisher-Porter tube with a stirbar, and to this was added 8 mL hexadecane. This mixture was stirred rapidly, and 335 μL tetraethoxysilane (Si(OEt)$_4$) was added. The tube was sealed with a pressure head having a thermocouple attached, and the reaction mixture was heated to 250° C. within 5 min. The temperature was held at 250° C. for 30 min, resulting in a slightly milky transparent solution. The colloidal solution was then cooled to room temperature and placed into a vial. The average particle size as determined by dynamic light scattering was 350 nm.

Example 6

B$_2$O$_3$ 601 mg of Lauric acid was weighed into a 100 mL Fisher-Porter tube with a stirbar, and to this was added 8 mL hexadecane. This mixture was stirred rapidly, and 112 μL trimethylborate (B(OMe)$_3$) was added. The tube was sealed with a pressure head having a thermocouple attached, and the reaction mixture was heated to 250° C. within 5 min. The temperature was held at 250° C. for 30 min, resulting in a slightly milky transparent solution. The colloidal solution was then cooled to room temperature and placed into a vial. The average particle size as determined by dynamic light scattering was 165 nm.

Example 7

TiO$_2$ 1048 mg Lauric acid was weighed into a 100 mL Fisher-Porter tube with a stirbar, and to this was added 8 mL hexadecane. This mixture was stirred rapidly, and 519 μL Ti(OiPr)$_4$ was added, followed by 362 μL acetic anhydride. The tube was sealed with a pressure head having a thermocouple attached, and the reaction mixture was heated to 150° C. within 5 min. The temperature was held at 250° C. for 30 min, resulting in a slightly milky transparent solution. The colloidal solution was then cooled to room temperature and placed into a vial. The average particle size as determined by dynamic light scattering was 60 nm.

Example 8

TiO$_2$ 1048 mg Lauric acid was weighed into a 100 mL Fisher-Porter tube with a stirbar, and to this was added 8 mL hexadecane. This mixture was stirred rapidly, and 300 mg Ti(OMe)$_4$ was added, followed by 362 μL acetic anhydride. The tube was sealed with a pressure head having a thermocouple attached, and the reaction mixture was heated to 150° C. within 5 min. The temperature was held at 250° C. for 30 min, resulting in a slightly milky transparent solution. The colloidal solution was then cooled to room temperature and placed into a vial. The average particle size as determined by dynamic light scattering was 80 nm.

Dynamic Light Scattering Measurements

Samples were prepared by dilution into 1.2 mL hexadecane solvent (filtered with a 0.02 micron filter) after passing through a 0.45 micron filter. Dynamic light scattering was performed using a Brookhaven Instruments BI-200SM goniometer. A Melles Griot He—Ne laser of wavelength 633 nm was used. The sample cell, which consisted of a glass test tube, was contained in a constant temperature bath of vat fluid, decalin which was index matched with glass. The vat fluid was filtered through 0.2 μm filter to remove dust. The temperature of the vat fluid was maintained by a recirculating bath fluid, which heated and cooled a plate beneath the vat fluid bath as necessary. Light intensity was measured with an avalanche photodiode with the output signal processed by a BI-9000AT digital correlator. Correlation functions were measured over delay times ranging from 0.1 μs to 1 sec and at a fixed angle of 90°. Correlation functions were collected for a duration that was 200 times longer than the largest reported delay time.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

The invention claimed is:

1. A process for producing particles, comprising mixing, in a substantially water-free environment,
   a) at least one metal compound of the formula MX$_{(m-n)}$, wherein M is an electropositive element of Groups 1–15, each X is independently selected from the group consisting of O$_{1/2}$, F, Cl, Br, I, OR, O$_2$CR, NR$_2$, and R, each R is independently a hydrocarbyl group, n is equal to ½ the oxidation state of the metal M in the product particle, and m is equal to the oxidation state of M in the compound MX$_{(m-n)}$,
   b) at least one surfactant, and
   c) at least one solvent,
   wherein the mixture is thermally treated for a time sufficient to convert the at least one metal compound into particles of the corresponding oxide having sizes in a range between about 0.5 nanometer and about 1000 nanometers.

2. The process of claim 1 wherein X is an alkoxide of the form OR wherein said alkoxide is selected from the group consisting of methoxide, ethoxide, i-propoxide, n-butoxide, t-butoxide, phenoxide, 2,6-dimethylphenoxide, trifluoromethoxide, trifluoroethoxide and hexafluoro-i-propoxide.

3. The process of claim 1 wherein X is a carboxylate of formula OC(O)R, wherein said carboxylate is selected from the group consisting of formate, acetate, laurate, stearate, benzoate and pivalate.

4. The process of claim 1 wherein X is a hydrocarbyl group denoting a monovalent, linear, branched, cyclic, or polycyclic group containing carbon and hydrogen atoms, the hydrocarbyl group optionally containing atoms in addition to carbon and hydrogen, said additional atoms selected from Groups 15 and 16 of the Periodic Table.

5. The process of claim 4, wherein X comprises at least one group selected from C$_1$–C$_{30}$ alkyl; C$_1$–C$_{30}$ alkyl substituted with one or more groups selected from C$_1$–C$_{30}$ alkyl, C$_3$–C$_{15}$ cycloalkyl, or aryl; wherein aryl denotes a substituted or unsubstituted phenyl, naphthyl, or anthracenyl group.

6. The process of claim 1 wherein the metal compound is selected from the group consisting of Si(OR)$_4$, Ti(OR)$_4$, Zr(OR)$_4$, NaOAc, Ca(OAc)$_2$, Ba(OAc)$_2$, Y(OAc)$_3$, Ti(OMe)$_2$(OAc)$_2$, Ti(OiPr)$_2$(OAc)$_2$, Zr(OiPr)$_2$, (OAc)$_2$, Nb(OAc)$_{5/2}$(OEt)$_{5/2}$, W(O)(OAc)$_2$(OEt)$_2$, Re(O)(OAc)$_3$py$_2$, Zn(OAc)$_2$, B(OAc)$_3$, B$_3$O$_3$(OAc)$_3$, Al(OAc)$_3$, and Bu$_2$Sn(OAc)$_2$.

7. The process of claim 1 wherein at least one X is the surfactant.

8. The process of claim 1 wherein the metal compound further comprises at least one Lewis base ligand L$_p$, wherein p≧0.

9. The process of claim 8, wherein at least one Lewis base ligand L$_p$ is the surfactant.

10. The process of claim 1 wherein the surfactant is a nonionic surfactant.

11. The process of claim 10 wherein the surfactant is selected from the group consisting of oleic acid, stearic acid, linoleic acid, lauric acid, azelaic acid, palmitic acid, linolenic acid and erucic acid.

12. The process of claim 1 wherein said surfactant is an ionic surfactant.

13. The process of claim 1 wherein said solvent is selected from the group consisting of hexadecane, dioctyl ether, diphenyl ether, aromatic hydrocarbon solvents, aliphatic solvents, dibutyl ether, didecyl ether, dodecane, tetradecane, decaline, toluene, xylenes, mesitylene, anisole and combinations thereof.

14. The process of claim 1 wherein said surfactant is also a dehydrating agent.

15. The process of claim 14 wherein the dehydrating agent is selected from the group consisting of acid anhydrides, thionyl chloride, phosphorus oxides, and combinations thereof.

16. The process of claim 1 wherein said mixing is conducted at a temperature in the range between about 50° C. and about 350° C.

17. The process of claim 16 wherein said mixing is conducted at a temperature in the range between about 150° C. and about 250° C.

18. The process of claim 1 wherein said particles have a variation in size distribution in a range between about −50% and about +50%.

19. A process for producing particles comprising mixing, in a substantially water-free environment,
   a) at least one metal compound of the formula Si(OR)$_4$ or Ti(OR)$_4$ wherein each R is independently a hydrocarbyl group,
   b) at least one carboxylic acid surfactant, and
   c) at least one hydrocarbon solvent, wherein the mixture is thermally treated for a time sufficient to convert the at least one metal compound into particles of the corresponding oxide having sizes in a range between about 0.5 nanometers and about 1000 nanometers.

* * * * *